C. E. FULK & J. J. GOOD.
Plows.
No. 154,470. Patented Aug. 25, 1874.
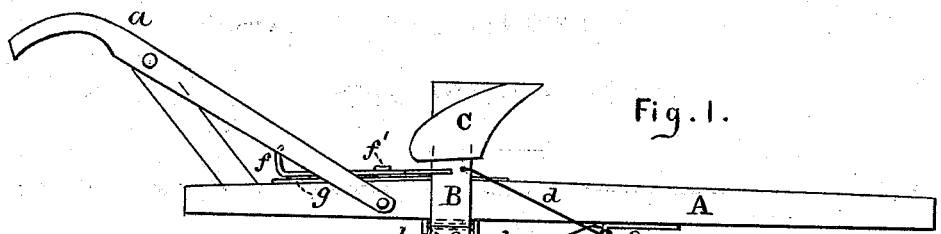
Fig. 1.
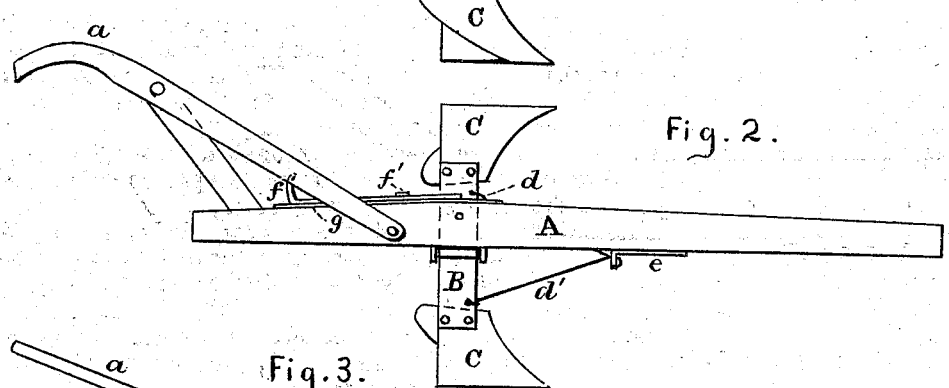
Fig. 2.
Fig. 3.
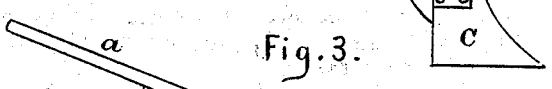
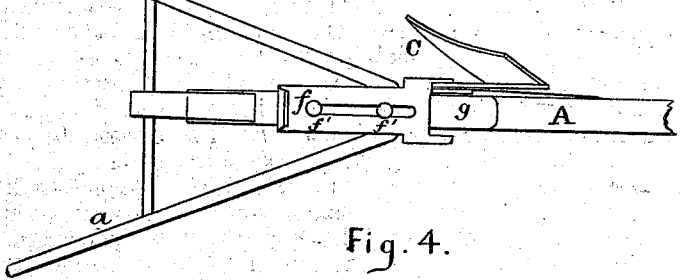
Fig. 4.
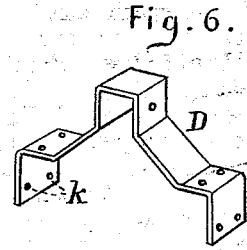
Fig. 6.
Fig. 5.
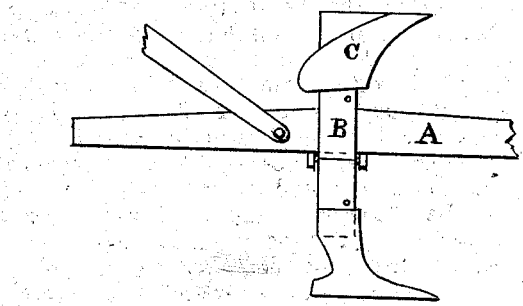
Witnesses:
H. A. Daniels
Carroll Webster
Inventors:
Columbus E. Fulk
Joshua J. Good
by C. H. W. J. Howard
their attorneys.
THE GRAPHIC CO. PHOTO-LITH. 39 & 41 PARK PLACE, N.Y.

UNITED STATES PATENT OFFICE.

COLUMBUS E. FULK AND JOSHUA J. GOOD, OF CYNTHIANA, KENTUCKY; SAID FULK ASSIGNOR TO SAID GOOD.

IMPROVEMENT IN PLOWS.

Specification forming part of Letters Patent No. 154,470, dated August 25, 1874; application filed June 1, 1874.

*To all whom it may concern:*

Be it known that we, COLUMBUS E. FULK and JOSHUA J. GOOD, of Cynthiana, in the county of Harrison and State of Kentucky, have invented certain Improvements in Plows, of which the following is a specification; and we do hereby declare that in the same is contained a full, clear, and exact description of our said invention, reference being had to the accompanying drawing, and to the letters of reference marked thereon.

Our invention relates to a combination implement adapted to be used, by a simple change in the arrangement of its parts, as a hill-side, single-turning or sub-soil plow, or a ditcher.

In the accompanying drawing, forming a part of this specification, Figure 1 shows an elevation of the implement arranged as a right-hand side-hill plow. Figure 2 represents the same changed to a left-hand side-hill plow. Fig. 3 is a top view of Fig. 2. Fig. 4 shows another arrangement of the plows, adapting the implement to be used interchangeably as a single-turning plow and a sub-soiler. Fig. 5 illustrates the implement converted into a ditcher. Fig. 6 is a detached view of a yoke used in changing the implement into a ditcher.

Similar letters of reference indicate similar parts of the invention in all the views.

Referring to Fig. 1, A is the plow-beam having ordinary handles, a, at the rear. Under the beam are two staples, b, which form bearings for a pin, c, passing through and making a pivot for a double plow-share standard, B, having at each end a plow-share, C, each occupying an inverted position with reference to the other. An upper and a lower brace, marked respectively d and d', connect the front part of the standard B to a plate-fastener, e, the connection being made between the standard and fastener by the braces in such manner that the pivotal movement of the said standard is unimpeded by the braces. The standard is kept to a vertical position by means of a slotted sliding plate, f, having its front edge cut out so as to form a mouth which slips over the rear part of that portion of the pivoted standard B carrying the plow-share not in use. The plate f slides upon a plate, g, secured to the beam, and is guided by the standing-bolts f'.

In changing the implement so that it shall cut a left-hand furrow, the position of the plow-shares is simply reversed, as seen in Fig. 2.

In Fig. 4, the standard B is seen provided with a single-turning plow-share and a sub-soiler. By the ability of the plowman to change the implement from a single-turning plow to a sub-soiler, but one team is necessary for both uses, which, in small farming, is a great consideration.

In converting the implement into a ditcher, the shares C are detached from the standard B, the sliding plate f is withdrawn, and the standard allowed to fall to a horizontal position. The yoke D is then slipped over the beam, the plate g forming a seat for the yoke, and a bolt, h, passed through the yoke and beam, as shown. The yoke D and standard B are then secured together by bolts i, which pass through holes in the yoke provided for the purpose, and the holes in the standard before used for the bolts attaching the shares C thereto. The ditching-blade, for which one of the shares C, or another device is used, is secured by bolts to the holes k in one of the straight lateral parts of the yoke. If preferred, the soil may be turned out both ways by using both shares C secured land-side to land-side to one end of the yoke, or a share may be attached at each end of the brace, thus enabling the plowman to plow two furrows at the same time, turning the soil out each way, as in the cultivation of cotton or young corn.

Having thus described our invention, what we claim as new therein, and wish to secure by Letters Patent of the United States, is—

1. The pivoted standard B, carrying the plow-shares, in combination with the front braces d d' secured to the said standard and plow-beam, as specified, to admit of the pivotal movement of the standard, and the sliding plate $f$, substantially as and for the purposes set forth.

2. The combination of beam A, standard B, and braces $d\ d'$, with the yoke D, to adapt the reversible plow for use as a ditcher, or as a double plow, substantially as herein set forth.

In testimony whereof, we have hereto subscribed our names this 12th day of May, A. D. 1874.

COLUMBUS E. FULK.
JOSHUA J. GOOD.

Witnesses:
GEORGE W. WILLIAMS,
THOMAS T. FORMAN.